(No Model.)

C. F. THOMAS.
CAR FENDER.

No. 518,904. Patented Apr. 24, 1894.

WITNESSES:
Fred G. Dieterich
Solon C. Kemon

INVENTOR
Charles F. Thomas
BY Munn & Co
ATTORNEYS.

THE NATIONAL LITHOGRAPHING COMPANY,
WASHINGTON, D. C.

UNITED STATES PATENT OFFICE.

CHARLES F. THOMAS, OF BUCKEYSTOWN, MARYLAND.

CAR-FENDER.

SPECIFICATION forming part of Letters Patent No. 518,904, dated April 24, 1894.

Application filed December 28, 1893. Serial No. 494,946. (No model.)

*To all whom it may concern:*

Be it known that I, CHARLES F. THOMAS, residing at Buckeystown, in the county of Frederick and State of Maryland, have invented certain new and useful Improvements in Car-Fenders, of which the following is a specification.

My invention relates more particularly, to fenders for street cars, and it has primarily for its object, to provide a fender attachment which can be quickly and conveniently connected to or disconnected from the car body, without the necessity of removing any bolts or other securing means.

It has for its object, to provide a fender, which, when attached to the car body, will be held from vertical or lateral play, whereby it will, at all times, be held from coming in contact with the ground or track way.

It has for its object, furthermore, to provide a catch net frame, which will bend inward as the body falls therein, to the more effectually form a receiver for the body and hold it from being thrown sidewise.

With other objects in view, which will hereinafter be referred to, the invention consists, in a car fender, embodying the peculiar combinations and novel arrangement of parts, which will be first described in detail, and then specifically pointed out in the claims, reference being had to the accompanying drawings, in which—

Figure 1:
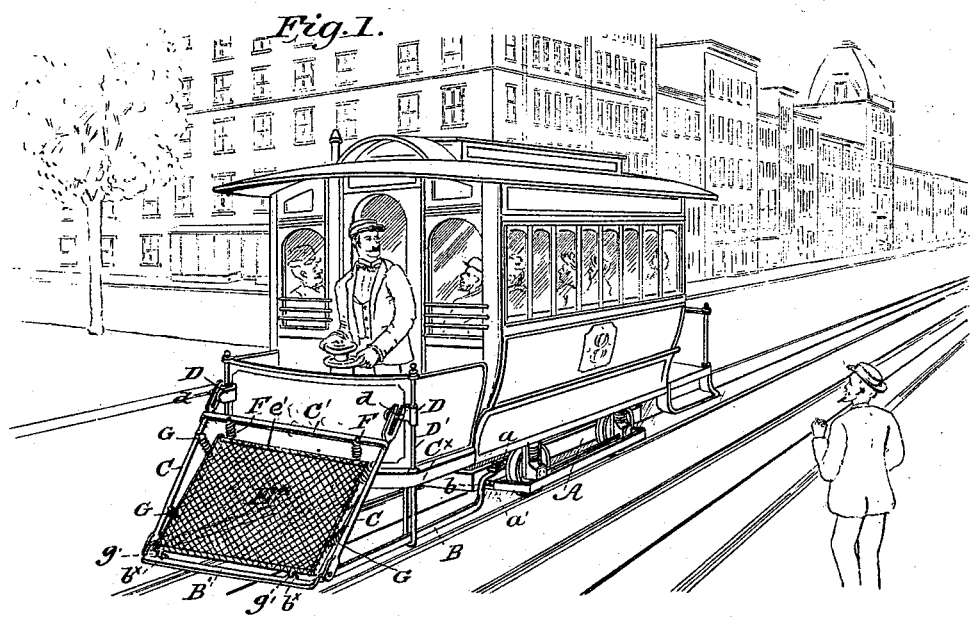
Figure 2:
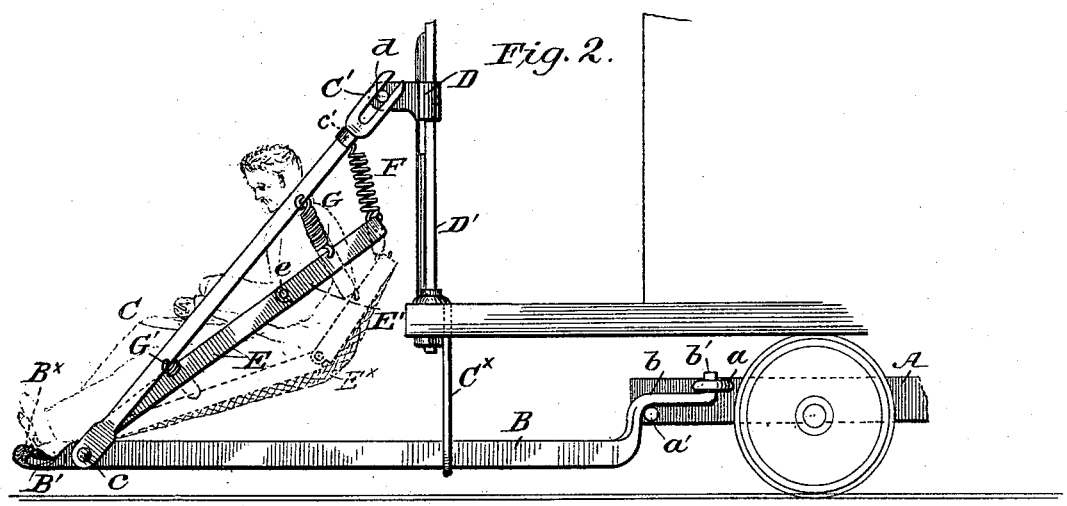
Figure 3:
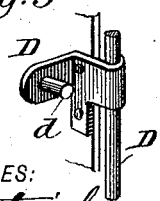
Figure 4:
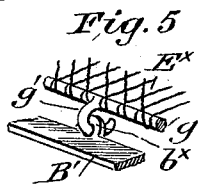
Figure 5:
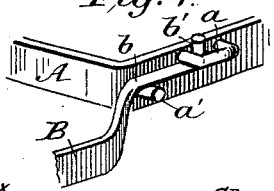

Figure 1 is a perspective view, illustrating my improved fender devices as applied for use. Fig. 2 is a side view thereof, the net frame being shown to its folding or depressed position in dotted lines. Fig. 3 is a detail view of the upper or dash guide or support. Fig. 4 is a detail view of the hook connections for the main frame, and Fig. 5 is a detail view hereinafter particularly referred to.

In the practical application of my improved fender devices, they are connected with the car in such a manner as to remain in a fixed position, irrespective of the vertical swing of the car body. To this end I prefer to connect them with the grip frame, when used on a cable car, or on a supplemental frame secured on the car axles, when used on electric cars.

Referring now to the drawings, A, indicates the grip or supplemental frame, and B the main or supporting arms of the fender frame, to which the remaining fender portions are attached in the manner presently described, such arms being the side members of a ⌴-shaped frame, the front or cross bar B' of which is twisted at right angles to the side arms to form a flat plunger member, which in practice may be covered with a yielding substance as shown at B$^\times$, in Fig. 2, to prevent undue shock on the lower limbs, when it strikes a body. This ⌴ shaped frame is adapted to be supported at its inner end on the frame A, and held normally in a horizontal position just above the track, and for such purpose the rear end of the arms B are bent up at right angles and terminate in bearing members $b$ which rest on studs $a'$, projected from the frame A, and such members $b$, have hook ends $b'$, which fit up through staples $a$, as shown most clearly in Fig. 2. By thus connecting the arms B they can be quickly attached to or detached from the frame A, and held to a horizontal position by the studs $a'$, the downward strain of such arms being relieved, by passing such arms through guide staples C$^\times$, projected down from the front end of the platform as shown.

C indicates the side bars of the fender frame, which are pivotally connected at their lower ends to the front end of the arms B, as at $c$, while their upper ends terminate in forked members C', which are supported on studs $d$, formed on brackets D, secured to the dash rail D' and the dash. By connecting the upper ends of the side bars C, to the dash and pivoting the lower ends in the manner shown, the fender frame will thereby be effectively braced laterally, and the car body allowed to move vertically without affecting the horizontal position of the fender frame. The side bars C are further braced by the cross member $c'$.

E$^\times$ indicates the net or catch frame, which is formed of side members, connected at the upper end by a cross member $e'$ and at the lower end by a cross member $g$, which member ($g$) has hooks $g'$ which engage eyes $b^\times$ (see Fig. 5) whereby the net frame is detachably connected to the main frame.

It will be noticed by reference to Fig. 2, the side bars of the net frame are formed of sections E, E', having a rule hinge joint $e$, such joint being about one third the distance from the upper end, for a purpose presently explained. The net frame is connected to the main frame C by the hooks g' at the lower end, the springs F, which support the upper cross bar, and the springs G G, which connect with the side bars E E'.

From the foregoing description taken in connection with the drawings it will readily be seen, that the main supporting frame will be at all times held from contact with the track, and serve as a plunger to trip the person struck by the fender, and as such person falls onto the net, such frame, owing to its yielding connection with the main frame, will form a cushion like receiver, to break the fall, and as the side bars of such net frame are formed of hinged members, such net frame will tend to double up, the rear portion forming substantially a back rest, and thereby keep the body substantially in an upright position as shown in dotted lines in Fig. 2. Furthermore by forming the sides of the net frame of hinged sections, the supporting springs F and G will also be relieved of a considerable pull strain. Finally by constructing a fender as described, the same can be produced at a very small cost, but one need be used for each car, when double enders are used, as the fender can be readily lifted from its bearings at one end and shifted to the opposite end of the car. The same is of few parts, all of which are detachably connected with each other, whereby they can be easily separated and adjusted into a compact space for shipping or storing.

Having thus described my invention, what I claim, and desire to secure by Letters Patent, is—

1. An improved car fender, comprising a main fender frame adapted to be connected to the truck frame and held rigid therewith, brace bars pivoted at their lower ends to the said main frame, and having their upper ends formed for a detachable and sliding connection with the car dash, all substantially as shown and for the purposes described.

2. An improved car fender, comprising a main frame adapted to be connected to the truck frame, brace bars pivotally connected at their lower ends to the main frame and having their upper ends constructed to detachably connect with and have a limited movement, relatively to the dash, and a supplemental or net frame, having a hinged connection at the lower end with the main frame, and yielding connections between the upper portion of the net frame and the brace bars all substantially as shown and for the purposes described.

3. In combination with the main fender frame adapted to be rigidly connected at its rear end to the truck frame, and guide members on the dash, of brace bars pivoted at their lower ends to the main fender frame, and having forked upper ends engaging the dash guides, all arranged substantially as shown and for the purposes described.

4. A car fender, comprising a horizontal main or supporting frame, and diagonally arranged brace bars connected with the car dash, and a net frame held on the horizontal frame and side bars, by yielding connections, all arranged substantially as shown and described.

5. A car fender comprising a main supporting frame, adapted to be connected rigidly with the truck frame, and formed with side bars having a movable connection with the car dash, and a net frame having a hinged connection at the lower end with the main frame, and a yielding connection with the side bars at the upper end; said net frame including side bars, having hinged joints near their upper ends, all arranged substantially as and for the purposes shown and described.

6. The combination in a car fender, with the main supporting frame, having a front cross bar and side bars connected at their lower ends to the main frame, of the net frame having hook members adapted to engage the lower cross bar of the main frame, spring supports for suspending such net frame from the side bars, and means for connecting the upper ends of such side bars to the car dash, all arranged substantially as shown and for the purposes described.

7. In a car fender, the combination with the main supporting frame, and means for holding it on the car body, and from a swinging movement, of the side bars, pivoted at their lower ends to the main frame, and having a movable connection at their upper end with the dash board, the net frame E$^\times$ having side members hinged to fold inward, and formed with long lower portions and short upper portions, and having upper and lower cross bars, and spring supports connecting the net frame to the side bars all arranged substantially as shown and for the purposes described.

CHARLES F. THOMAS.

Witnesses:
A. I. McKENNA,
C. C. KESSLER.